US007433901B2

(12) United States Patent
Cannon et al.

(10) Patent No.: US 7,433,901 B2
(45) Date of Patent: Oct. 7, 2008

(54) APPARATUS, SYSTEM, AND METHOD FOR USING MULTIPLE CRITERIA TO DETERMINE COLLOCATION GRANULARITY FOR A DATA SOURCE

(75) Inventors: David Maxwell Cannon, Tucson, AZ (US); Donna Jee, Tucson, AZ (US); Michael Kaczmarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 10/943,665

(22) Filed: Sep. 17, 2004

(65) Prior Publication Data

US 2006/0064430 A1 Mar. 23, 2006

(51) Int. Cl.
*G06F 17/30* (2006.01)

(52) U.S. Cl. .................... 707/204; 707/102; 707/3; 707/10; 709/201; 711/161

(58) Field of Classification Search .............. 707/102, 707/101, 103 R, 3, 10, 204; 709/201; 711/161
See application file for complete search history.

(56) References Cited

U.S. PATENT DOCUMENTS

| 5,285,494 | A | * | 2/1994 | Sprecher et al. ............. 455/423 |
|---|---|---|---|---|
| 5,644,698 | A | * | 7/1997 | Cannon ........................ 714/6 |
| 5,673,382 | A | * | 9/1997 | Cannon et al. ................. 714/6 |
| 5,787,697 | A | | 8/1998 | Post ........................... 711/170 |
| 5,890,156 | A | * | 3/1999 | Rekieta et al. ................ 707/10 |
| 5,983,316 | A | | 11/1999 | Norwood ..................... 711/112 |
| 6,040,843 | A | * | 3/2000 | Monroe et al. .............. 345/530 |
| 6,226,759 | B1 | * | 5/2001 | Miller et al. .................... 714/6 |
| 6,405,198 | B1 | | 6/2002 | Bitar et al. ...................... 707/6 |
| 6,996,569 | B1 | * | 2/2006 | Bedell et al. ................. 707/100 |
| 2003/0084241 | A1 | | 5/2003 | Lubbers et al. .............. 711/114 |
| 2003/0154238 | A1 | * | 8/2003 | Murphy et al. .............. 709/201 |
| 2003/0204597 | A1 | * | 10/2003 | Arakawa et al. ............ 709/226 |
| 2004/0117358 | A1 | * | 6/2004 | von Kaenel et al. ............ 707/3 |
| 2004/0199515 | A1 | * | 10/2004 | Penny et al. .................. 707/10 |
| 2005/0165722 | A1 | * | 7/2005 | Cannon et al. ................. 707/1 |
| 2005/0210218 | A1 | * | 9/2005 | Hoogterp ..................... 711/203 |
| 2006/0036624 | A1 | * | 2/2006 | Hild et al. ................... 707/100 |

OTHER PUBLICATIONS

Author: Sun Microsystems, Inc. Title: Sun ONE Messaging Server 6.0 Adminiatrator's Guide, SunOne Open Net Enviornment Chapter 15 Managing the Message Store. Date: Dec. 2003; Publisher: Sun ONE Open Net Encironment; Edition: version 6.0; Pertinent pp. 64 http://docs.sun.com/source/816-6738-10/store.htm#wp23980.*

* cited by examiner

*Primary Examiner*—Hosain T Alam
*Assistant Examiner*—Syling Yen
(74) *Attorney, Agent, or Firm*—Kunzler & McKenzie

(57) ABSTRACT

An apparatus, system, and method are disclosed for collocating data. A mode module sets a collocation mode of a storage pool. The collocation mode specifies the granularity of the data to be collocated. In one embodiment, an assignment module assigns a source of data to a collocation group. A collocation module collocates the source's data to a minimum number of storage pool volumes based on the collocation mode of the storage pool and collocation group assignment of the source.

11 Claims, 10 Drawing Sheets

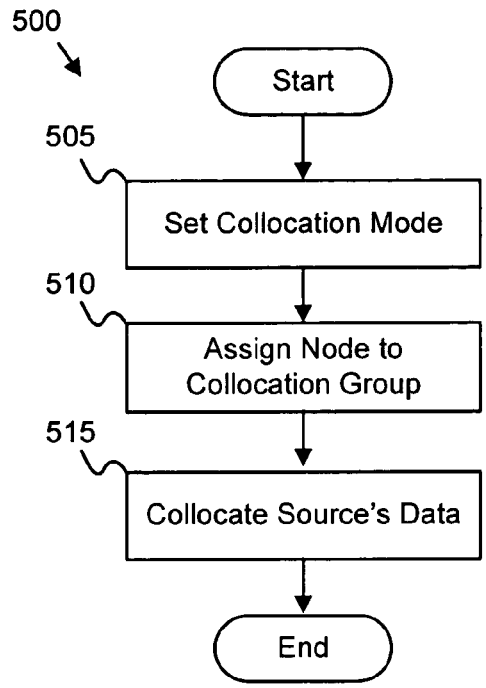

FIG. 5

| | Collocation Mode 605 | Source Collocation Group Assignment 610 | Collocation Action 615 |
|---|---|---|---|
| First Entry 620a | No Collocation | NA | No Collocation |
| Second Entry 620b | Collocation Group | No Assignment | Collocation by Node |
| Third Entry 620c | Collocation Group | Collocation Group Assigned | Collocation by Group |
| Fourth Entry 620d | Node | NA | Collocation by Node |
| Fifth Entry 620e | Storage Device | NA | Collocation by Storage Device |

FIG. 6

APPARATUS, SYSTEM, AND METHOD FOR USING MULTIPLE CRITERIA TO DETERMINE COLLOCATION GRANULARITY FOR A DATA SOURCE

BACKGROUND OF THE INVENTION

1. Field of the Invention

This invention relates to determining collocation granularity and more particularly relates to using multiple criteria to determine collocation granularity for a data source.

2. Description of the Related Art

Computer networks typically include a plurality of client nodes, herein referred to as nodes. Nodes may be a personal computer, a server, or the like. Each node may include one or more storage devices that store data. For example, a server node may include two hard disk drives that store the server's data. A storage device may be physical storage device or a logical storage device comprising a logical portion of one or more physical storage devices. For example, the hard disk drive may be divided into two or more logical storage devices.

Computer networks often include a storage manager. The storage manager's functions typically include backing up data from each node of the computer network to one or more storage pools, and recovering data from the storage pool to each node. The storage pool may be an array of hard disk drives, magnetic tape drives, optical storage drives or the like. The storage pool typically includes one or more storage pool volumes. The storage pool volume may be a logical volume of a hard disk, a magnetic tape cartridge, an optical disk, or the like.

The storage manager may back up data from a source such as a node or a storage device to one or more storage pool volumes and track the backed up data. For example, the storage manager may copy the data on each of the server's hard disk drives to a plurality of magnetic tape cartridge storage pool volumes. The storage manager may retrieve the data from the storage pool volumes to restore data to the hard disk drives. For example, if the server's first hard disk drive failed, the storage manager may copy the server's backed up data from the magnetic tape cartridges to a replacement server hard disk drive to restore the data. In restoring the data, each magnetic tape cartridge that includes the data from the server's first hard disk drive is mounted on a magnetic tape drive, and the storage manager copies the desired data to the replacement hard disk drive. The storage manager may also archive data from a source to a storage pool volume, retrieve data from a storage pool volume to the source, migrate data from the source to a storage pool volume, and recall data from the storage pool volume to the source.

Unfortunately, the process of mounting a plurality of storage pool volumes such as magnetic tape cartridges can greatly increase the time required to copy data from the storage pool volumes to a node such as the server's hard disk drive. For example, there are often delays between the time that a storage pool is ready to mount a storage pool volume and the time that the storage pool volume is actually mounted. Yet delays in restoring data can be costly. The costs of restoration delays are increased if data is dispersed among a plurality of storage pool volumes. For example, if eighty gigabytes (80 GB) of data is stored on portions of four (4) one hundred gigabyte (100 GB) magnetic tapes, the data will take longer to recover than if the data is stored on a single one hundred gigabyte (100 GB) magnetic tape.

Data from a source of data is often collocated to a minimum number of storage pool volumes in order to speed an operation such as a recovery. For example, a storage pool may be configured to collocate the data from a node to a minimum number of storage pool volumes. Collocating data can reduce the number of storage pool volume mounts required to restore data or the like, particularly if the storage pool volume is a sequential media such as magnetic tape. Unfortunately, collocating the data of a single source such as a single node or a single storage device may waste much of the storage capacity of the storage pool volume, particularly if the storage capacity of the storage pool volume is significantly greater than the storage capacity of the source.

As a result, a group of nodes or storage devices may be organized as a collocation group. The data from each node or storage device in the collocation group is collocated to the collocation group's storage pool volume during an operation such as a back up operation. For example, a one hundred gigabyte (100 GB) storage pool volume may have sufficient storage capacity for backing up the data of a collocation group of ten (10) nodes. If the storage pool is configured to collocate a collocation group's data, the storage manager may copy each node's data to the collocation group's storage pool volume when the node is backed up. Thus the data from all of the collocation group's nodes is collocated, even if even if each node is backed up at a different time.

Unfortunately, determining the appropriate collocation granularity for all combinations of storage pools and sources of data may be impractical as each storage pool and each source may have unique granularity requirements. In addition, an administrator may wish to collocate the data of a source of one granularity such as a node to a storage pool configured to collocate another level of granularity such as a collocation group.

From the foregoing discussion, it should be apparent that a need exists for an apparatus, system, and method that uses multiple collocation criteria to determine collocation granularity for a source. Beneficially, such an apparatus, system, and method would improve the effectiveness of data collocation with reduced administrative overhead.

SUMMARY OF THE INVENTION

The present invention has been developed in response to the present state of the art, and in particular, in response to the problems and needs in the art that have not yet been fully solved by currently available data collocation methods. Accordingly, the present invention has been developed to provide an apparatus, system, and method for collocating data that overcomes many or all of the above-discussed shortcomings in the art.

The apparatus to collocate data is provided with a logic unit containing a plurality of modules configured to functionally execute the necessary steps of setting a collocation mode, assigning a source to a collocation group, and collocating the source's data. These modules in the described embodiments include a mode module, an assignment module, and a collocation module.

The mode module sets a collocation mode of a storage pool. The storage pool comprises a plurality of storage pool volumes wherein each storage pool volume stores data. The collocation mode specifies the granularity of data be collocated. For example, the collocation module may specify a node type collocation mode, directing the collocation of the data of a node to a minimum number of storage pool volumes. The mode module may also not specify a collocation mode for the storage pool's collocation mode.

The assignment module assigns the source to a collocation group. The source may be a node or a storage device. The collocation group comprises a plurality of nodes or storage devices. The collocation module collocates the source's data to a minimum number of storage pool volumes based on the collocation mode of the storage pool and collocation group assignment of the source. The apparatus uses multiple collocation criteria to determine the collocation granularity for a source.

A system of the present invention is also presented to collocate data. The system may be embodied in a storage management system. In particular, the system, in one embodiment, includes a storage pool, a source, and a storage manager including a mode module, an assignment module, and a collocation module.

The source may be a node or a storage device. The storage manager stores data from the source to one or more storage pool volumes mounted on the storage pool and may further retrieve data from the storage pool volumes to the source. For example, the storage manager may back up data from the source to a storage pool volume.

The mode module sets a collocation mode of the storage pool. The assignment module assigns the source to a collocation group. The collocation module collocates the source's data based on the collocation mode of the storage pool and collocation group assignment of the source. For example, if the collocation mode specifies a collocation group type and the source is assigned to a collocation group, the collocation module collocates the source's data to the collocation group's one or more storage pool volumes.

A method of the present invention is also presented for collocating data. The method in the disclosed embodiments substantially includes the steps necessary to carry out the functions presented above with respect to the operation of the described apparatus and system. A mode module sets a collocation mode of the storage pool. An assignment module assigns the source to a collocation group. A collocation module collocates the source's data to a minimum number of storage pool volumes based on the collocation mode of the storage pool and collocation group assignment of the source. In one embodiment, the collocation module uses a look-up table to determine the collocation arrangement of the source's data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention determines the collocation granularity for a source based on multiple collocation critieria. In addition, the present invention may improve the effectiveness of data collocation with reduced administrative overhead. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a schematic flow chart diagram illustrating one embodiment of a collocation method in accordance with the present invention;

FIG. 6 is a schematic block diagram illustrating one embodiment of a look-up table of the present invention;

DETAILED DESCRIPTION OF THE INVENTION

Figure 1:
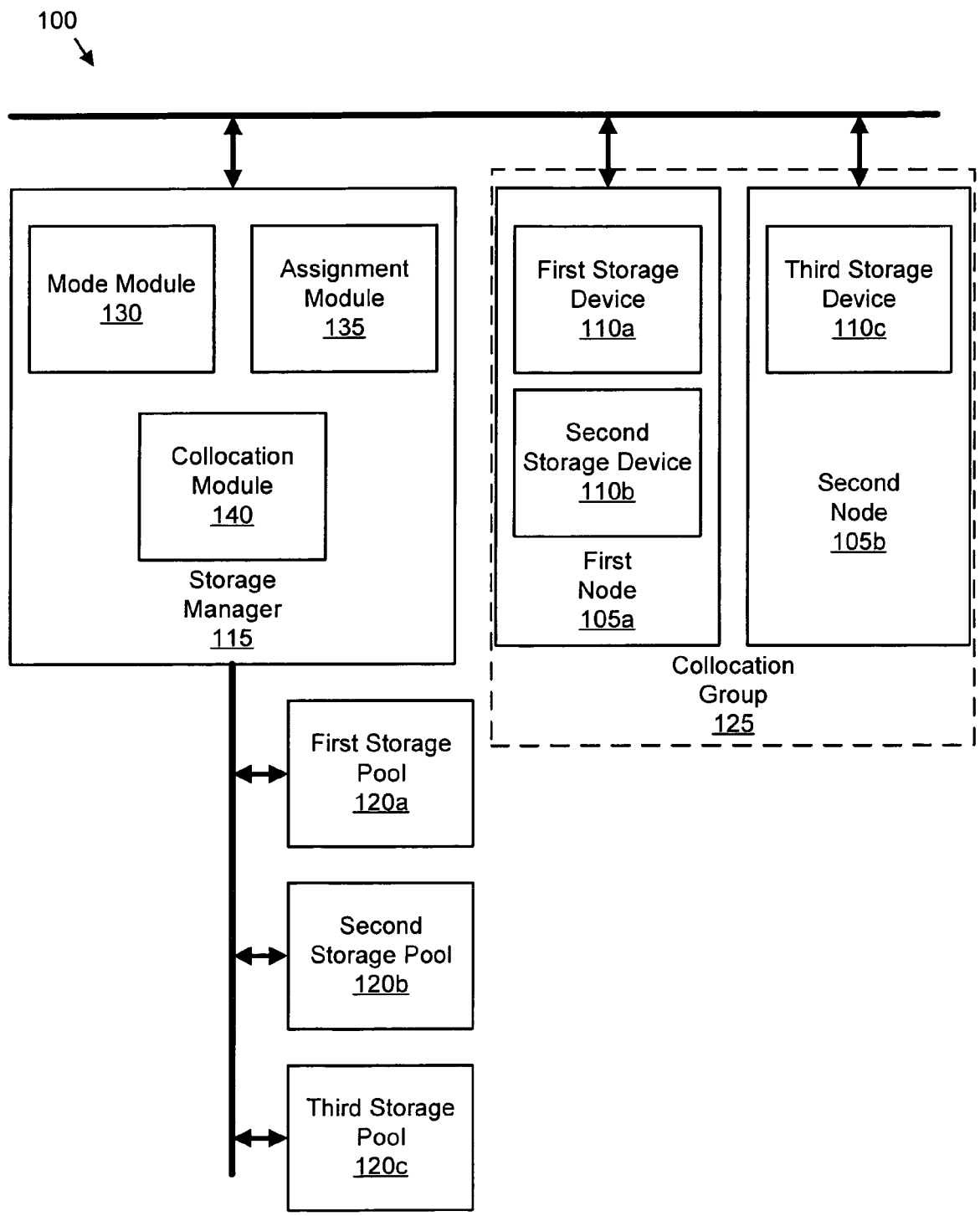
FIG. 1 is a schematic block diagram illustrating one embodiment of a computer network in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computer network 100 of the present invention. The network 100 includes one or more storage pools 120, one or more nodes 105, and a storage manager 115 comprising a mode module 130, an assignment module 135, and a collocation module 140. Although the network 100 is depicted with two (2) nodes 105 and three (3) storage pools 120, any number of nodes 105 and storage pools 120 may be employed. In one embodiment, the storage manager 115 is a Tivoli Storage Manager produced by International Business Machines Corporation of Armonk, N.Y.

The node 105 may comprise one or more storage devices 110. The storage device 110 stores data. In one embodiment, the storage device 110 is a physical storage device. In an alternate embodiment, the storage device 110 is a logical storage device configured as a logical division of one or more physical storage devices. In a certain embodiment, the storage device 110 comprises both physical and logical storage devices.

One or more nodes 105 or one or more storage devices 110 may be assigned to a collocation group 125. In the depicted embodiment, the first node 105a and the second node 105b are each assigned to the collocation group 125. The collocation group 125 maybe associated with one or more storage pool volumes wherein the data of nodes 105 or storage devices 110 assigned to the collocation group 125 are collocated in the collocation group's 125 associated storage pool volumes.

The node 105 and the storage device 110 may be configured as a source of data referred to herein as a source. The storage manager 115 manages the movement of data between the source and the storage pools 120, and data movement among the storage pools 120. In one embodiment, the storage manager 115 backs up data from the source to a first storage pool 120a and restores data from the first storage pool 120a to the source. The storage manager 115 may also back up data from the source to a first storage pool 120a, migrate the data from the first storage pool 120a to the second storage pool 120b, and retrieve the data from the second storage pool 120b to the source.

In one embodiment, the storage manager 115 archives data from the source to the first storage pool 120a. The storage manager 115 may also retrieve archived data from the first storage pool 120a to the source. In a certain embodiment, the storage manager 115 migrates data from the source to the first storage pool 120a and recalls data from the first storage pool 120a to the source.

The mode module 130 sets a collocation mode for the storage pool 120. The collocation mode specifies the granularity of the data that is to be collocated to the storage pool 120. For example, the mode module 130 may specify a storage device type, anode type, or a collocation group type collocation mode wherein the storage device type is most granular and the collocation group type is least granular. The source is collocated by being copied to a minimum number of storage pool volumes. For example, if the collocation mode specifies the node type, the storage pool 120 collocates the node's 105 data to a minimum number of storage pool volumes.

The assignment module 135 assigns the source to the collocation group 125. In the depicted embodiment, the assignment module 135 assigns the first node 105a and the second node 105b to the collocation group 125. The mode module 130 may set a collocation group type collocation mode directing the storage pool 120 to collocate the source's data with the collocation group's 125 data if the source is assigned to the collocation group 125.

The collocation module 140 collocates the source's data to a minimum number of storage pool volumes based on the collocation mode of the storage pool 120 and collocation group assignment of the source. For example, if the collocation mode specifies a collocation group source type, the collocation module 140 collocates the data of each source assigned to the collocation group 125 by the assignment module 135, as depicted the first node 105a and the second node 105b, to the collocation group's 125 storage pool volumes. In an alternate example, if the mode module 130 sets the collocation mode to the storage device type and the source is the first node 105a, the collocation module 140 collocates the data of the first storage device 110a to a first minimum number of storage pool volumes and also collocates the data of the second storage device 110b to a second minimum number of storage pool volumes.

The network 100 collocates data based on multiple collocation criteria such as the collocation mode of a storage pool 120 and the collocation group assignment of a source. Using multiple collocation criteria increases the efficiency of the network 100 by appropriately collocating data. In addition, the network 100 reduces the administrative overhead required to define collocation assignments by supporting both node collocation and collocation group collocation for the same node 105, without requiring different collocation group assignments for that node 105.

Figure 2A:
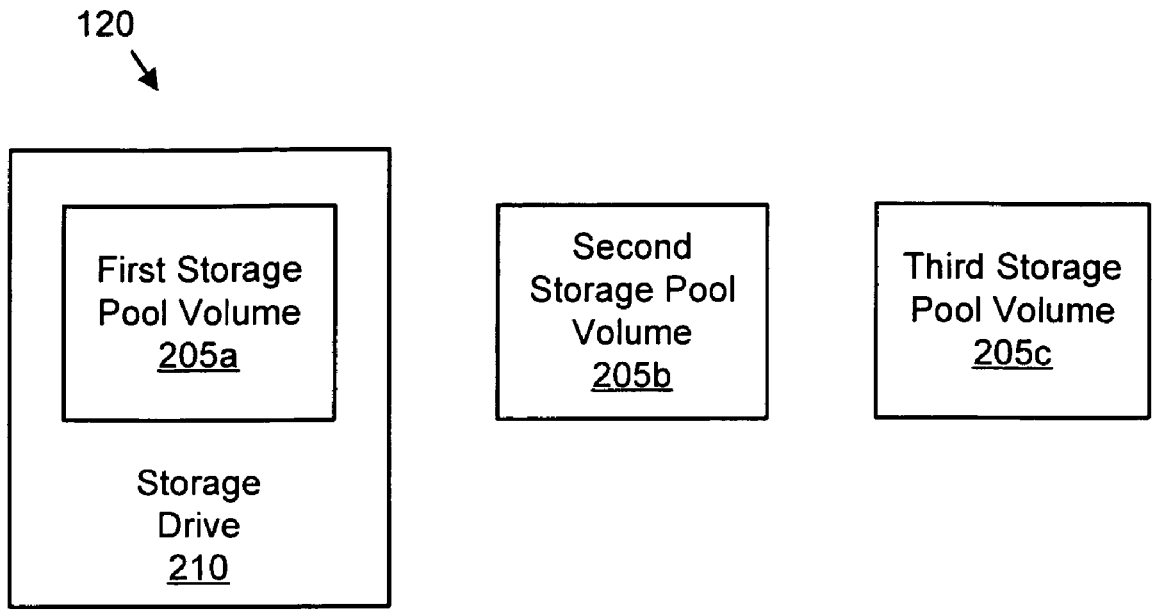
FIGS. 2a and 2b are schematic block diagrams illustrating one embodiment of a storage pool of the present invention.
Figure 2B:
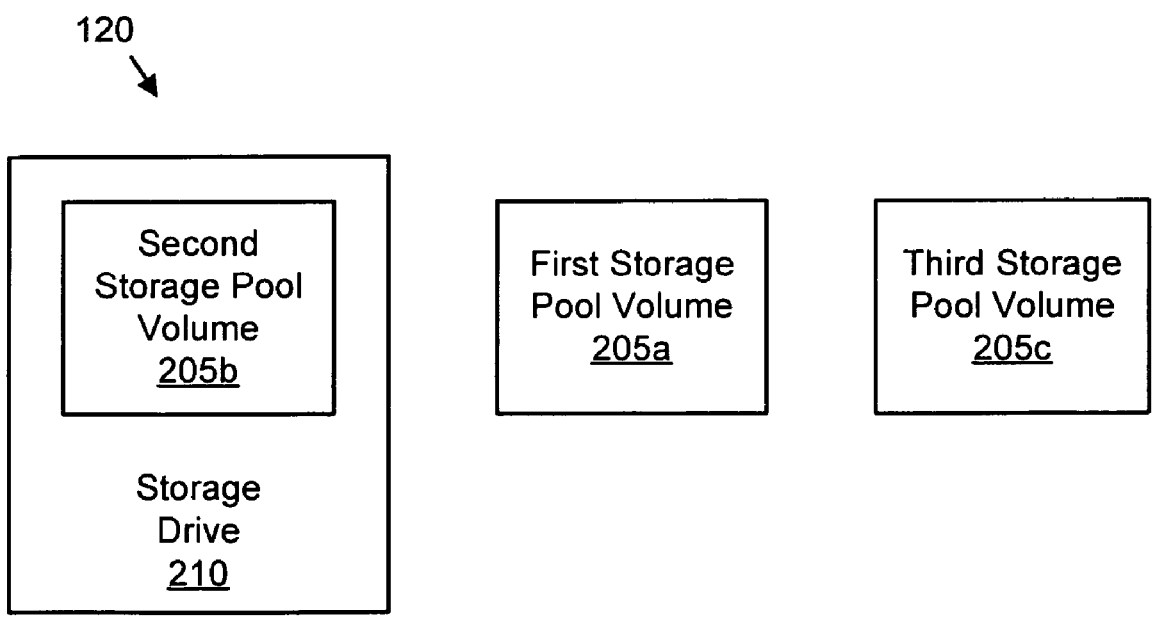

FIGS. 2a and 2b are schematic block diagrams illustrating one embodiment of a storage pool 120 of the present invention. The storage pool 120 includes a storage drive 210. Although for simplicity the storage pool 120 is depicted with one (1) storage drive 210, any number of storage drives 210 may be employed.

Referring to FIG. 2a, a first storage pool volume 205a is mounted to the storage drive 210. The storage drive 210 may store data to and retrieve data from the first storage pool volume 205a. In addition, a second storage pool volume 205b and third storage pool volume 205c may also store data, although the storage drive 210 can only store data to and retrieve data from the second storage pool volume 205b and the third storage pool volume 205c if the second storage pool volume 205b or the third storage pool volume 205c are mounted on the storage drive 210. In a certain embodiment, the first storage pool volume 205a, the second storage pool volume 205b, and the third storage pool volume 205c are each mounted on a storage drive 210.

Referring to FIG. 2b, the first storage pool volume 205b is dismounted from the storage drive 210 and the second storage pool volume 205b is mounted to the storage drive 210. The storage drive 210 can store data to and retrieve data from the second storage pool volume 205b, while the data of the first storage pool volume 205a and the third storage pool volume 205c may only be accessed by the storage drive 210 after being mounted.

Figure 3:
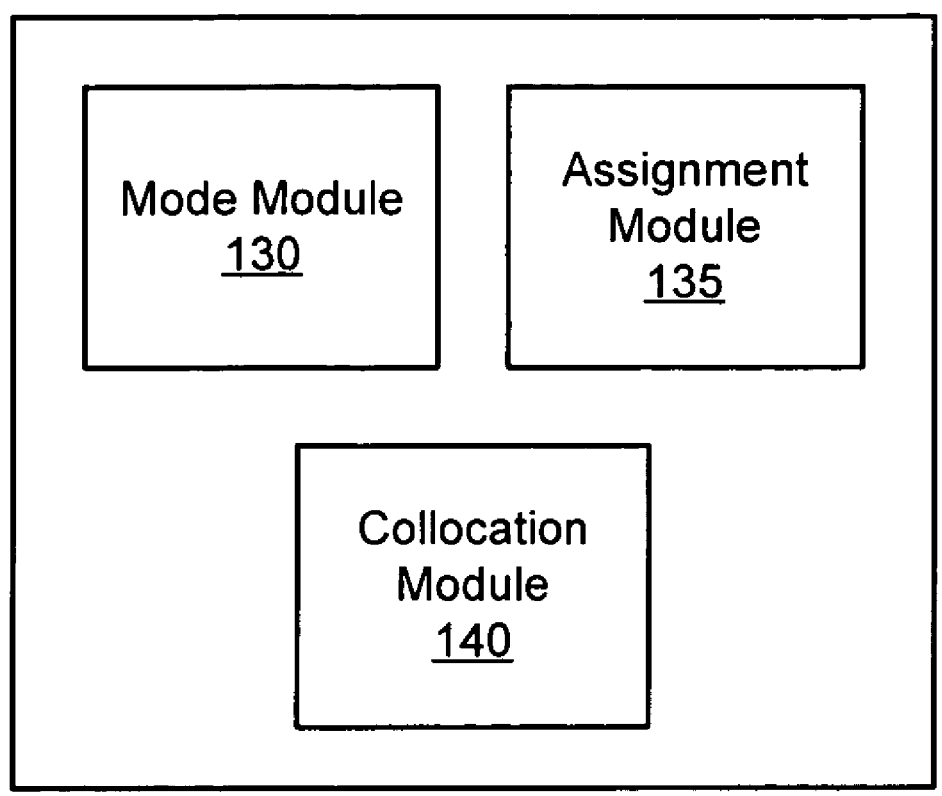
FIG. 3 is a schematic block diagram illustrating one embodiment of a collocating apparatus of the present invention.

FIG. 3 is a schematic block diagram illustrating one embodiment of a collocating apparatus 300 of the present invention. A mode module 130 sets a collocation mode for a storage pool 120. In one embodiment, the mode module 130 is a software program executing on a storage manager 115. In an alternate embodiment, the mode module 130 is a software program executing on a host system such as a server, an administrator computer or the like.

In a certain embodiment, the mode module 130 receives direction on setting the collocation mode from an administrator. For example, the administrator may direct the mode module 130 to set the collocation mode for the first storage pool 120a to the node type. The mode module 130 may track the collocation mode for one or more storage pools 120. In an alternate embodiment, the mode module 130 communicates the collocation mode to the storage pool 120 and the storage pool 120 stores the collocation mode.

The assignment module 135 assigns a source to a collocation group 125. For example, the assignment module 135 may assign a first node 105a to the collocation group 125 comprising a second node 105b. In one embodiment, the assignment module 135 can assign any source to the collocation group 125. In an alternate embodiment, the assignment module 135 assigns sources of the same type to the collocation group 125. For example, the assignment module 135 may only assign nodes 105 to the collocation group 125.

In one embodiment, the assignment module 135 is a software program executing on a host system such as a server, an administrator computer, or the like. In an alternate embodiment, the assignment module 135 executes on the storage manager 115. The assignment module 135 may receive direction from the administrator and assign the source to the collocation group 125 in response to the direction. For example, the administrator may direct the assignment module 135 to assign the first node 105a to the collocation group 125. In one embodiment, the assignment module 135 tracks the collocation group 125 assignment of each source.

The collocation module 140 collocates the source's data to a minimum number of storage pool volumes based on the collocation mode of the storage pool 120 and collocation group assignment of the source. In a certain embodiment, the collocation module 140 is a software program executing on the storage manager 115, a host system, or the like. In one embodiment, the collocation module 140 uses a look-up table with the collocation mode of the storage pool 120 and the collocation group assignment of the source as inputs to determine the collocation arrangement for the data from the source. The apparatus 300 uses the multiple collocation criteria of the collocation mode of a storage pool 120 and collocation group assignment of the source to determine the collocation granularity of the source data.

Figure 4:
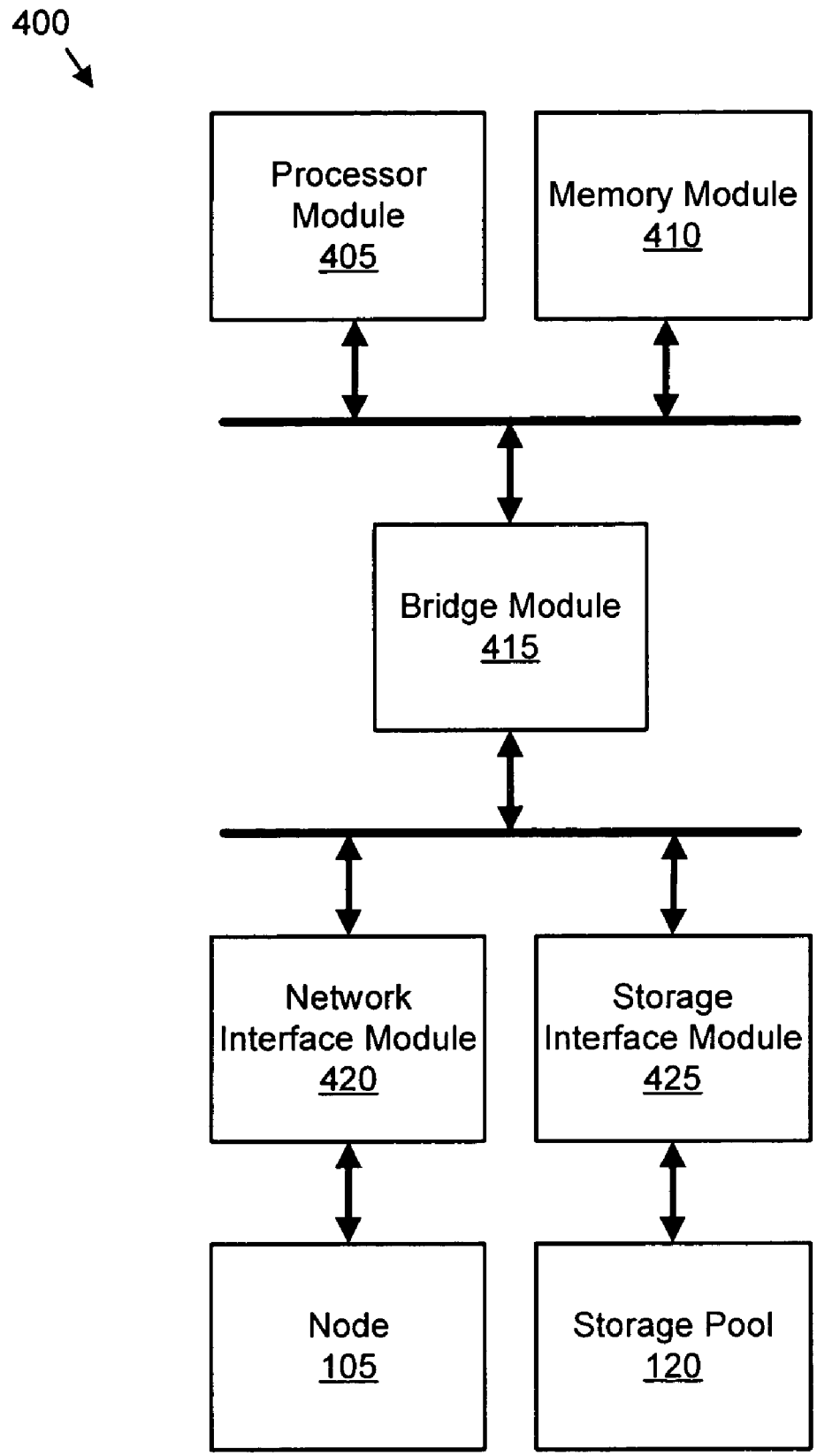
FIG. 4 is a schematic block diagram illustrating one embodiment of a storage manager of the present invention.

FIG. 4 is a schematic block diagram illustrating one embodiment of a storage manager 400 of the present invention. The storage manager 400 includes a processor module 405, a memory module 410, a bridge module 415, a network interface module 420, and a storage interface module 425. The memory module 410 stores data and software instructions. The processor module 405 executes the software instructions and processes the data as is well known by those skilled in the art. The processor module 405 communicates with the network interface module 420 and the storage interface module 425 through the bridge module 415.

In a certain embodiment, the storage manager 400 is the storage manager 115 depicted in FIG. 1. In one embodiment, the processor module 405 executes the mode module 130, the assignment module 135, and the collocation module 140. The mode module 130 may communicate with a storage pool 120 through the storage interface module 425. The storage interface module 425 may be a Fibre Channel interface card or the like. The assignment module 135 may also communicate with a node 105 through the network interface module 420. The network interface module 420 may be a plurality of semiconductor gates fabricated as an Ethernet interface or the like.

In one embodiment, the collocation module 140 copies data from a source such as the node 105 through the network interface module 420 and the storage interface module 425 to the storage pool 120. The storage manager 400 collocates data from a source based on multiple collocation criteria.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 5 is a schematic flow chart diagram illustrating one embodiment of a collocation method 500 in accordance with the present invention. In one embodiment, mode module 130 sets 505 a collocation mode for a storage pool 120. In a certain embodiment, the mode module 130 sets 505 the collocation mode in response to an administrator input. For example, the administrator may direct the mode module 130 to set 505 the collocation mode for a first storage pool 120a to a collocation group type and further direct the mode module 130 to set 505 the collocation mode for a second storage pool 120a to a storage device type. In addition, the mode module 130 may also not specify the collocation mode for the storage pool 120.

The mode module 130 may set 505 the collocation mode based on the data transfer speed of the storage pool 120. In one embodiment, the mode module 130 may set 505 the collocation mode to a more granular type such as a node type or a storage device type for a high speed storage pool 120, and may further set 505 the collocation mode to a less granular type such as a collocation group type for a slower speed storage pool 120.

The assignment module 135 assigns 510 a source to a collocation group 125. In one embodiment, the assignment module 135 assigns 510 the source to the collocation group 125 in response to the direction of an administrator. In an alternate embodiment, the assignment module 135 assigns 510 the source to the collocation group in response to the direction of an owner of the source. For example, the owner of a node 105 may direct the assignment module 135 to assign 510 the node 105 to the collocation group 125 comprising nodes 105 of the owner's workgroup.

The collocation module 140 collocates 515 the source's data to a minimum number of storage pool volumes 205 based on the collocation mode of the storage pool 120 and collocation group assignment of the source. In one embodiment, the collocation module 140 collocates 515 the source's data as part of a regularly scheduled backup operation. In an alternate embodiment, the source's owner directs 140 the collocation module 140 to collocate 515 the source's data. For example, the owner of a node 105 may direct the collocation module 140 to collocate the node's 105 data during a back up period.

In one embodiment, the collocation module 140 collocates 515 the node's 105 data if the collocation mode is the node type. The collocation module 140 may further collocate 515 a storage device's 110 data if the collocation mode is the storage device type. In addition, if the collocation mode is the collocation group type and the source is assigned to a collocation group 125, the collocation module 140 collocates 515 the source's data with the collocation group's 125 data on storage pool volume 205 associated with the collocation group 125. In addition, if the collocation mode is the collocation group type and the source is not assigned to a collocation group 125, the collocation module 140 collocates 515 the node's 105 data. The method 500 collocates 515 the data of the source using multiple collocation criteria to determine the collocation granularity of the source.

FIG. 6 is a schematic block diagram illustrating one embodiment of a look-up table 600 of the present invention. The look-up table 600 may be used by the collocation module 140 to determine the collocation arrangement of a source's data. In the depicted embodiment, the table 600 includes a plurality of entries 620, each comprising a collocation mode 605, a source collocation assignment 610, and a collocation action 615.

In one embodiment, a collocation module 140 comprises the look-up table 600. The collocation module 140 may select the entry 620 corresponding to both the collocation mode of a target storage pool 120 and a collocation group assignment of the source. The collocation module 140 collocates 515 the source's data as specified by the collocation action 615 of the corresponding table 600 entry 620. For example, if the collocation mode of the target storage pool 120 is a collocation group type and the source is assigned to a collocation group 125, the collocation module 140 selects the corresponding third entry 620c wherein the collocation mode 605 is the collocation group type and the source collocation group assignment 610 indicates that the source is assigned to a collocation group 125. In addition, the collocation module 140 collocates 515 the source's data to the storage pool volume 205 of the collocation group 125 as specified by the collocation action 615 of the third entry 620c.

Figure 7:
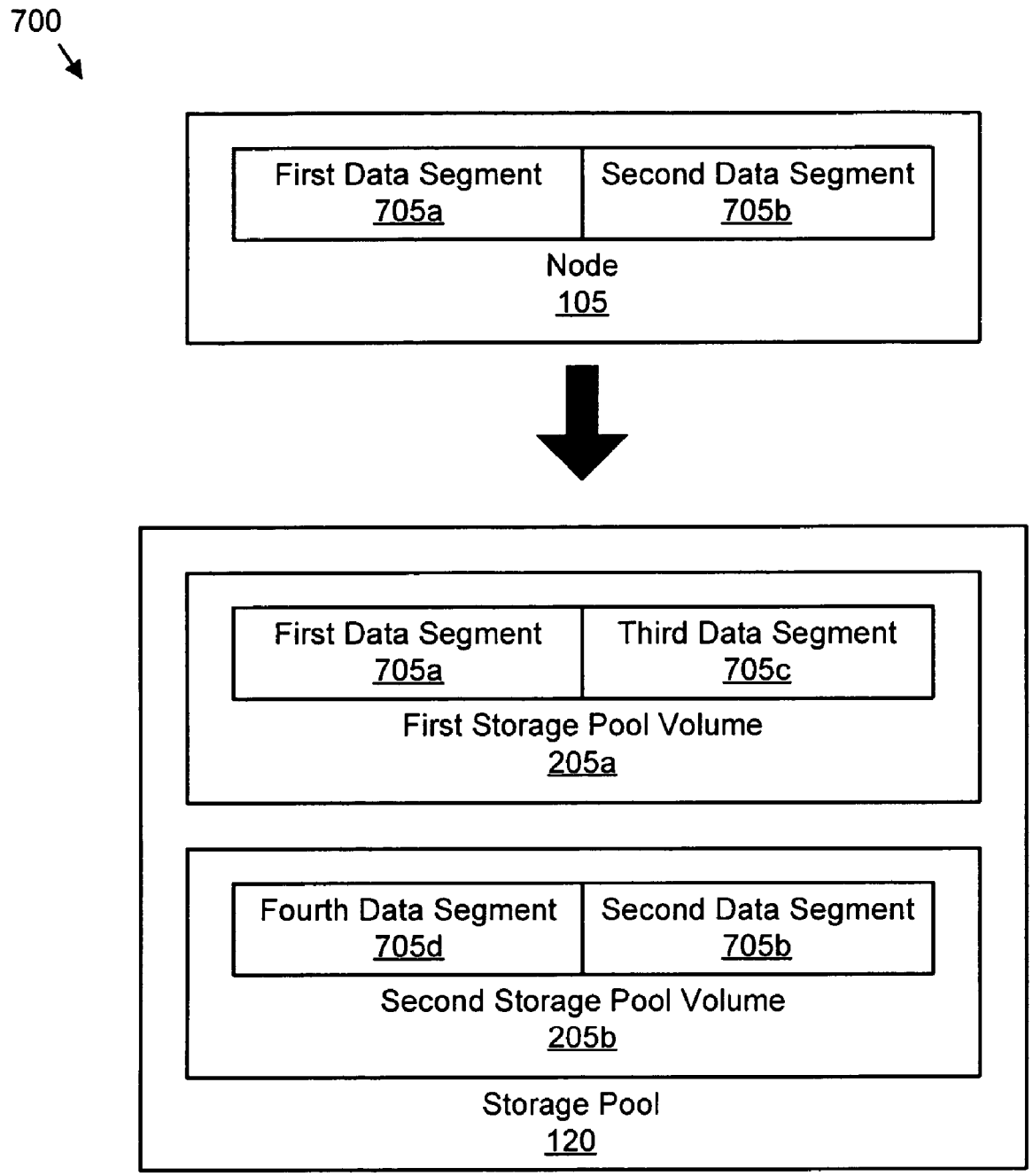
FIG. 7 is a schematic block diagram illustrating one embodiment of storing data without collocation in accordance with the present invention.

FIG. 7 is a schematic block diagram illustrating one embodiment of storing data without collocation 700 in accordance with the present invention. A node 105 includes data comprising a first data segment 705a and a second data segment 705b. In one embodiment, the mode module 130 did not assign the storage pool 120 a collocation mode.

A collocation module 140 stores the first and second data segments 705a, 705b to a first storage pool volume 205a and a second storage pool volume 205b. In the depicted embodiment, the collocation module 140 does not collocate the first and second data segments 705a, 705b. Instead the collocation module 140 stores the first data segment 705a to the first storage pool volume 205a and the second data segment 705b to the second storage pool volume 205b. The first data segment 705a is depicted as stored with a third data segment 705c and the second data segment 705b is depicted as stored with a fourth data segment 705d.

For example, the first data segment 705a may be stored with the third data segment 705c on the first storage pool volume 205a during a first back up period. The second data segment 705b may be subsequently created and stored with the fourth data segment 705d on the second storage pool volume 205b during a second back up period. Unfortunately, if the first and second data segments 705a, 705b are restored from the first and second storage pool volumes 205a, 205b to the node 105, both the first storage pool volume 205a and the second storage pool volume 205b must be mounted in a storage pool 120, increasing the time required to restore the first and second data segments 705a, 705b.

Figure 8:
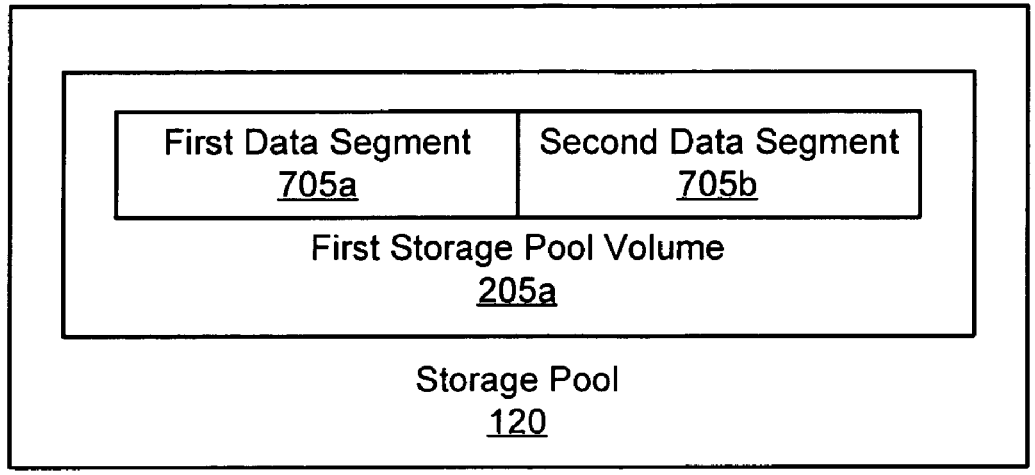
FIG. 8 is a schematic block diagram illustrating one embodiment of node collocation of the present invention.

FIG. 8 is a schematic block diagram illustrating one embodiment of node collocation 800 of the present invention. As in FIG. 7, a node 105 includes data comprising a first data segment 705a and a second data segment 705b. In one embodiment, a mode module 130 sets the collocation mode of a storage pool 120 to a node type.

A collocation module 140 collocates 515 the first and second data segment 705a, 705b to a first storage pool volume 205a of the storage pool 120. The collocation module 140 may collocate 515 the first and second data segments 705a, 705b to enable the first and second data segments 705a, 705b to be efficiently restored from the first storage pool volume 205a as only the first storage pool volume 205a need be mounted to the storage pool 120 to access all the stored data of the node 105. In contrast to FIG. 7, a collocation module 140 collocates 515 the first and second data segment 705a, 705b even if the first and second data segments 705a, 705b are stored at different times.

Figure 9:
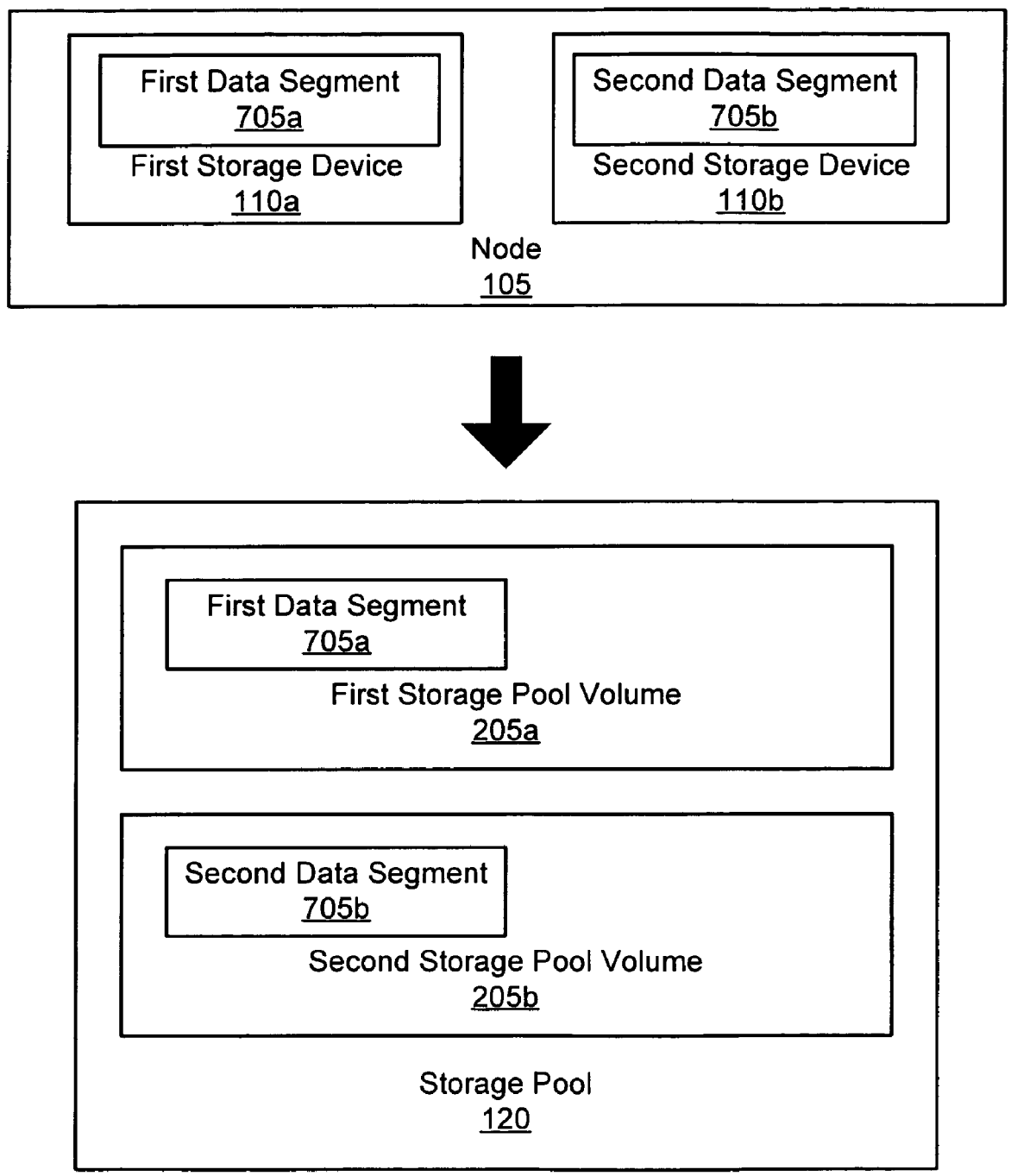
FIG. 9 is a schematic block diagram illustrating one embodiment of storage device collocation of the present invention.

FIG. 9 is a schematic block diagram illustrating one embodiment of storage device collocation 900 of the present invention. A node 105 includes a first storage device 110a comprising a first data segment 705a and a second storage device 110b comprising a second data segment 705b. In one embodiment, a mode module 130 assigns the storage device type collocation mode to a storage pool 120. A collocation module 140 collocates 515 the first data segment to a first storage pool volume 205a and further collocates 505 the second data segment to a second storage pool volume 205b, wherein the data of the first and second storage devices 110 are each collocated to a minimum number of storage pool volumes 205.

Figure 10:
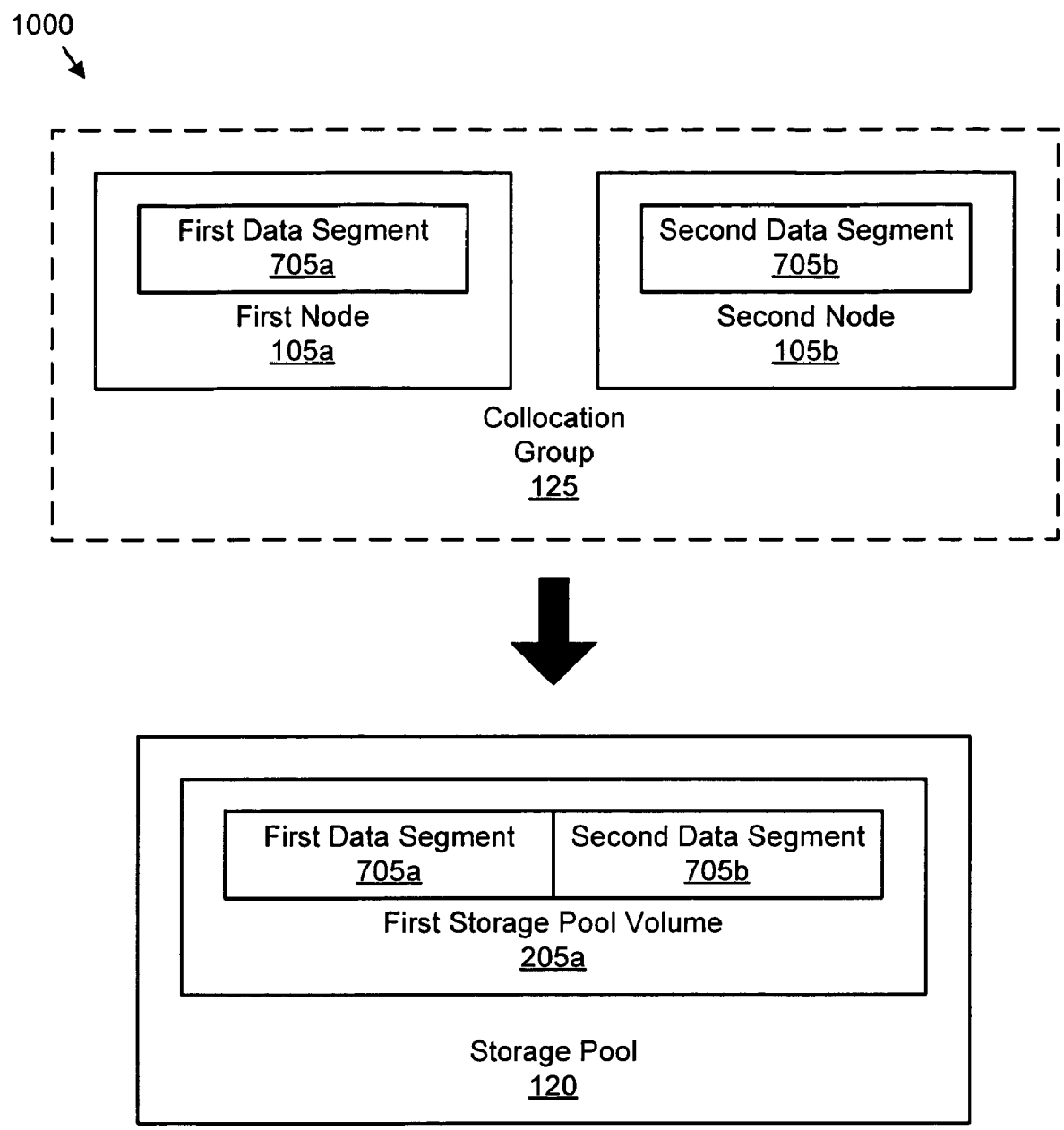
FIG. 10 is a schematic block diagram illustrating one embodiment of collocation group collocation of the present invention.

FIG. 10 is a schematic block diagram illustrating one embodiment of collocation group collocation 1000 of the present invention. A mode module 130 sets a collocation group type collocation mode for a storage pool 120. An assignment module 135 assigns 510 a first node 105a and a second node 105b to a collocation group 125. The first node 105a comprises a first data segment 705a and the second node 105b comprises a second data segment 705b. A collocation module 140 collocates 515 the data of each source assigned to the collocation group 125, that is the first data segment 705a of the first node 105a and the second data segment 705b of the second node 105b, to a first storage pool volume 205a wherein the first storage pool volume 205a is the minimum number of storage pool volumes 205 able to store the data of the collocation group 125.

Figure 11:
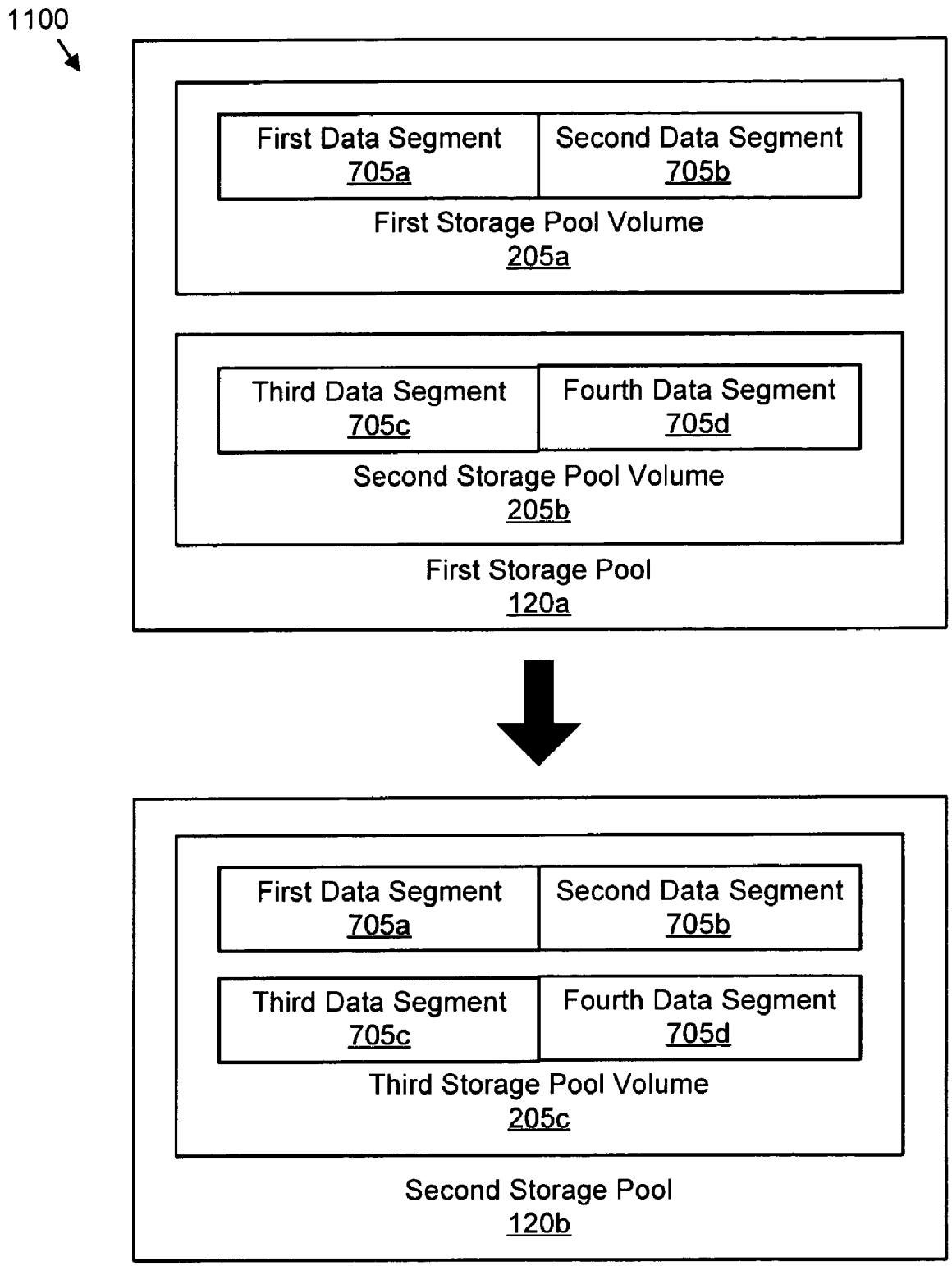
FIG. 11 is a schematic block diagram illustrating one embodiment of collocated data migration 1100 of the present invention.

FIG. 11 is a schematic block diagram illustrating one embodiment of collocated data migration 1100 of the present invention. In the depicted embodiment, collocation mode is the node type for a first storage pool 120a and the collocation mode is the collocation group type for a second storage pool 120b. A first and second data segment 705a, 705b are stored on the first storage pool volume 205a. The first and second data segments 705a, 705b maybe collocated data from a first source such as a first node 105a. A third data segment 705c and a fourth data segment 705d are stored on the second storage pool volume 205b. The third and fourth data segments 705c, 705d may also be collocated data from a second source such as a second node 105b. In addition, in the depicted embodiment, the first node 105a and the second node 105b are each assigned to a collocation group 125.

In the depicted embodiment, the data of the collocation group 125, the first storage pool volume 205a and the second storage pool volume 205b of the first storage pool 120a, is migrated and collocated to the third storage pool volume 205c of the second storage pool 120b. In one embodiment, the data is moved from the faster first storage pool 120a to the slower second storage pool 120b.

The present invention is the first to determine collocation granularity based on multiple collocation criteria such as a collocation mode of a storage pool 120 and a collocation group assignment of a source. In addition, the present invention may improve the effectiveness of data collocation with reduced administrative overhead. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to collocate data, the apparatus comprising:
   a processor;
   a memory communicatively coupled to the processor, the memory further comprising:
      a mode module configured to set a collocation mode of a storage pool comprising a plurality of storage pool volumes configured to store data, wherein the collocation mode is set from a plurality of collocation modes comprising a storage device type, node type, and a collocation group type;
      an assignment module configured to assign one or more sources of at least two sources comprising data to a collocation group; and
   a collocation module configured to collocate the at least two sources' data to a minimum number of storage pool volumes in the storage pool based on the collocation mode of the storage pool and collocation group assignment of the at least two sources, and wherein the collocation module:
      collocates a node's data to a minimum number of storage pool volumes in response to the collocation mode of the storage pool being node type;
      collocates a storage device's data to a minimum number of storage pool volumes in response to the collocation mode of the storage pool being storage device type; and
      collocates the one or more sources' data to a minimum number of storage pool volumes in response to the collocation mode of the storage pool being collocation group type and the one or more sources being assigned to a collocation group by the assignment module.

2. The apparatus of claim 1, wherein the collocation module is further configured to collocate a node's data to a minimum number of storage pool volumes if the collocation mode specifies the collocation group type and the node is not assigned to a collocation group.

3. The apparatus of claim 1, wherein the collocation module is further configured to not collocate the at least two sources' data if the collocation mode of the storage pool volume does not specify a type.

4. A system to collocate data, the system comprising:
   a storage pool comprising a plurality of storage pool volumes configured to store data;
   at least two sources comprising data;
   a storage manager comprising a processor and memory in communication with the storage pool and the at least two sources and comprising:
      a mode module configured to set a collocation mode of the storage pool, wherein the collocation is set from a plurality of collocation modes comprising a storage device type, node type, and a collocation group type;
      an assignment module configured to assign one or more sources of the at least two sources to a collocation group; and
      a collocation module configured to collocate the at least two sources' data to the minimum number of storage pool volumes in the storage pool based on the collocation mode of the storage pool and collocation group assignment of the at least two sources, and wherein the collocation module:
         collocates a node's data to a minimum number of storage pool volumes in response to the collocation mode of the storage pool being storage device type;
         collocates a storage device's data to a minimum number of storage pool volumes in response to the collocation mode of the storage pool being storage device type; and
         collocates the one or more sources' data to a minimum number of storage pool volumes in response to the collocation mode of the storage pool being collocation group type and the one or more sources being assigned to a collocation group by the assignment module.

5. The system of claim 4, wherein the collocation module is further configured to not collocate the at least two sources' data if the collocation mode of the storage pool volume does not specify a type.

6. The system of claim 4, wherein the storage pool is further configured as a hard disk drive.

7. The system of claim 4, wherein the storage pool is further configured as a magnetic tape drive.

8. A computer readable storage medium tangibly embodying a program of machine-readable instructions executed by a digital processing apparatus comprising a processor and memory to perform operations to collocate data, the operations comprising:
   setting a collocation mode of a storage pool comprising a plurality of storage pool volumes configured to store data, wherein the collocation mode is set from a plurality of collocation modes comprising a storage device type, node type, and a collocation group type;

assigning one or more sources of at least two sources comprising data to a collocation group; and collocating the at least two sources' data to the minimum number of storage pool volumes in the storage pool based on the collocation mode of the storage pool and collocation group assignment of the at least two sources, further comprising:

collocating a node's data to a minimum number of storage pool volumes in response to the collocation mode being node type;

collocating a storage device's data to a minimum number of storage pool volumes in response to the collocation mode of the storage pool being storage device type; and collocating the one or more sources' data to a minimum number of storage pool volumes in response to the collocation mode of the storage pool being collocation group type and the one or more sources being assigned to a collocation group by the assignment module.

9. The computer readable medium of claim 8, wherein the instructions further comprise operations to collocate a node's data to a minimum number of storage pool volumes if the collocation mode of the storage pool volume specifies the collocation group type and the node is not assigned to a collocation group.

10. The computer readable medium of claim 8, wherein the instructions further comprise operations to not collocate the at least two sources' data if the collocation mode of the storage pool volume does not specify a type.

11. The computer readable medium of claim 8, wherein the instructions further comprise operations to determine the collocation arrangement of the at least two sources' data using a look-up table configured with the collocation mode of the storage pool and the collocation group assignment of the source as inputs.

* * * * *